(12) United States Patent
Yabuki et al.

(10) Patent No.: US 6,364,431 B1
(45) Date of Patent: Apr. 2, 2002

(54) ELECTROMAGNETIC VALVE AND HYDRAULIC CIRCUIT

(75) Inventors: Yuji Yabuki; Moriharu Sakai, both of Kariya; Shinichi Tsujimura, Chiryu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/635,476

(22) Filed: Aug. 8, 2000

(30) Foreign Application Priority Data

Aug. 27, 1999 (JP) .......................................... 11-241468

(51) Int. Cl.⁷ ................................................ B60T 8/36
(52) U.S. Cl. ................................ 303/119.2; 303/115.4; 303/116.1; 137/627.5; 251/129.15
(58) Field of Search .......................... 303/113.1, 84.2, 303/119.2, 113.2, 119.1, 115.4, 115.5, 116.1, 116.2, 116.4; 137/627.5, 596.17; 251/129.15, 129.21, 330

(56) References Cited

U.S. PATENT DOCUMENTS

| | | | | |
|---|---|---|---|---|
| 4,312,380 A | * | 1/1982 | Leiber et al. | 137/627.5 |
| 5,316,378 A | * | 5/1994 | Maehara | 303/84.2 |
| 5,335,984 A | * | 8/1994 | Alaze et al. | 303/119.2 |
| 5,542,755 A | * | 8/1996 | Staib et al. | 303/119.2 |
| 5,683,151 A | | 11/1997 | Friedow et al. | |
| 5,718,489 A | | 2/1998 | Megerle et al. | |
| 6,065,816 A | * | 5/2000 | Nakazawa | 303/116.4 |
| 6,206,486 B1 | * | 3/2001 | Sakai et al. | 303/113.5 |
| 6,209,970 B1 | * | 4/2001 | Kamiya et al. | 303/119.2 |

* cited by examiner

Primary Examiner—Pam Rodriguez
(74) Attorney, Agent, or Firm—Law Office of David G. Posz

(57) ABSTRACT

An electromagnetic valve has a plunger as an armature of an electromagnetic actuator and a ball as a movable valve member. The plunger and the ball are separated to permit the ball to move freely in response to a pressure difference between an inlet and an outlet when the coil attracts the plunger. If the plunger undesirably moves by a pressure difference between both ends of the plunger, the ball can keep a closing condition during a suction pressure that is higher than a pressure in the inlet. Therefore, an undesired communication between a master reservoir and a pump is avoided.

10 Claims, 6 Drawing Sheets

US 6,364,431 B1

ELECTROMAGNETIC VALVE AND HYDRAULIC CIRCUIT

CROSS REFERENCE TO RELATED APPLICATION

This application is based on Japanese Patent Application No. Hei 11-241468 filed on Aug. 27, 1999, the content of which is incorporated herein by reference.

BACKGROUND OF THE INVENTION

1. Field of the Invention:

The present invention relates to an electromagnetic valve for a vehicular brake apparatus and a hydraulic circuit thereof.

2. Description of Related Art:

Conventionally, in a vehicular brake system, a pump is used for practicing several kinds of control methods such as a trace control (VSC), a traction control (TRC) and a brake assist control. The pump pressurizes a brake fluid from a master reservoir and supplies the pressurized brake fluid to a wheel cylinder. Additionally, a normally close type electromagnetic valve is used between the pump and the master reservoir for opening and closing a passage therebetween. For instance, FIG. 7 shows this kind of valve. A valve has a movable member 102 having a plunger 100 and a ball 101 which are welded integrally. Normally, a spring 103 pushes the movable member 102 in a direction A. Therefore, a fluid communication between a suction side of the pump and the master reservoir is closed by pressing the ball 101 on a seat surface 105 of a seat member 104. When a coil 106 is energized, the movable member 102 is attracted in a direction B, opens the connection.

However, in a case that a large pulsation is generated in a pressure P2, a pressure difference is generated between a front end and a rear end of the plunger 100. Therefore, the movable member 102 occasionally moves in direction B even though the coil 106 is not energized.

Such an unnecessary movement of the movable member 102 causes an unnecessary opening and lowers a controllability of the system.

SUMMARY OF THE INVENTION

The present invention addresses these drawbacks by providing an improved electromagnetic valve and a hydraulic circuit.

It is therefore an object of this invention to provide an electromagnetic valve for avoiding an unnecessary and undesired opening even if a pressure pulsation is generated.

It is a further object of this invention to provide a small electromagnetic valve.

It is another object of this invention to provide a hydraulic circuit having an electromagnetic valve in which an unnecessary and undesired opening is avoided even if a pressure pulsation is generated.

According to a first aspect of the present invention, a plunger and a movable member are made as independent members. The plunger is separated from the movable member to permit a free movement of the movable member between the plunger and the seat member. Therefore, if the plunger moves undesirably, the movable member can keep a closing condition in response to a pressure difference between a plunger side and a valve seat side.

The electromagnetic valve may apply to a hydraulic circuit, such as a brake fluid circuit for a vehicle. In this case, the electromagnetic valve is disposed between a suction side of a pump and a reservoir for supplying a brake fluid.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Hereinafter, preferred embodiments of the present invention will be explained with reference to the drawings.

In a first embodiment, an electromagnetic valve is used for a hydraulic circuit of a brake system for a vehicle. The electromagnetic valve is disposed in a passage between a master reservoir and a suction port of a pump.

Figure 1:
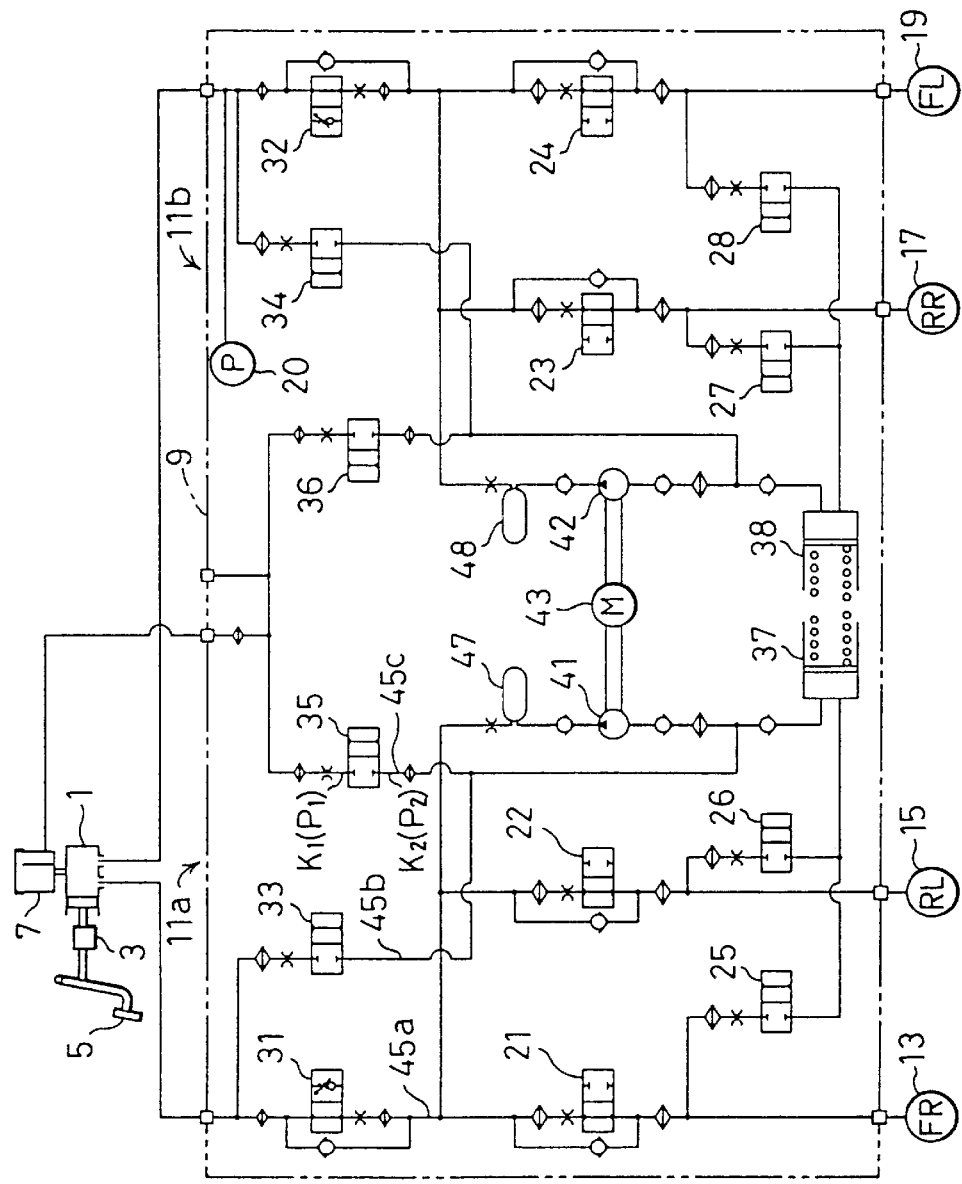
FIG. 1 is a circuit diagram of a brake fluid showing a brake control apparatus for a vehicle according to a first embodiment of the present invention.

Referring to FIG. 1, the brake system performs several kinds of functions by controlling methods such as an anti-skid control (ABS), a trace control (VSC), a traction control (TRC) and an advanced servo brake control (ASB). Here, the anti-skid control controls a pressure of a brake fluid to prevent a skid of a wheel when a brake pedal is operated. The trace control controls the pressure of the brake fluid to stabilize a movement of the vehicle when the vehicle turns. The traction control controls the pressure of the brake fluid to suppress a slip of a driven wheel. The advanced servo brake control (ASB) is also called a brake assist control. For instance, the ASB supplies a higher pressure than a pressure corresponding to an operating force of the brake pedal and supplies a required pressure when a brake booster is not in a working range and when the brake booster is in a failure.

The brake system has a tandem type master cylinder 1. A brake pedal 5 is connected to the master cylinder 1 via a brake booster 3. The muster cylinder 1 is connected to a master reservoir 7 and is connected to a fluid control circuit 9 controlling a brake fluid pressure. The fluid control circuit 9 is constructed by two independent channels that are arranged in a X piping layout (a diagonal piping). The fluid control circuit 9 has a first line 11a and a second line 11b.

The first line 11a connects a front right wheel cylinder (FR cylinder) 13 and a rear left wheel cylinder (RL cylinder) 15. The second line 11b connects a rear right wheel cylinder (RR cylinder) 17 and a front left wheel cylinder (FL cylinder) 19. The first and second lines have well-known control valves for controlling a fluid pressure in the cylinders 13, 15, 17 and 19 individually. The first line 11a has an increasing valve 21 and a decreasing valve 25 for controlling a fluid pressure in the cylinder 13 and has an increasing valve 22 and a decreasing valve 26 for controlling a fluid pressure in the cylinder 15. The second line 11b has an increasing valve 23 and a decreasing valve 27 for controlling a fluid pressure in the cylinder 17 and has an increasing valve 24 and a decreasing valve 28 for controlling a fluid pressure in the cylinder 19. The fluid control circuit 9 has a pressure sensor 20 for detecting a pressure in the master cylinder 1.

A SMC valve 31 is disposed between the valves 21 and 22 and the master cylinder 1 for opening and closing a passage 45a. A reservoir 37 for temporarily accumulating the fluid discharged from the decreasing valves 25 and 26 and a pump 41 for pressurizing fluid and sending it into the passage 45a are disposed in the first line 11a. An accumulator 47 for suppressing a pulsation is disposed in a discharge passage from the pump 41. The first line 11a has a passage 45b for directly supplying the fluid from the master cylinder 1 to the pump 41 when a pressure in the wheel cylinder is increased. A SRM valve 33 for opening and closing the passage 45b is disposed in the passage 45b. Similarly, the first line 11a has a passage 45c for directly supplying the fluid from the master cylinder 1 to the pump 41 when a pressure in the wheel cylinder is increased. A SRC valve 35 for opening and closing the passage 45c is disposed in the passage 45c.

Similarly, the second line 11b has similar components to the first line 11a such as increasing valve 23 and 24, decreasing valve 27 and 28, a SMC valve 32, a reservoir 38, a pump 42, an accumulator 48, a SRM valve 34 and a SRC valve 36.

A motor 43 is connected to both the pumps 41 and 42 for driving them. Additionally, as shown in FIG. 1, the system has a lot of passive components indicated by well-known symbols such as check valves (one-wayvalve),filters and orifices. For example, a filter is disposed on both of an inlet and an outlet of the valve 35. An orifice is disposed on the inlet of the valve 35. A filter and two check valves for allowing only a flow from the accumulator 37 to the pump are disposed between the accumulator and the pump.

Figure 2:
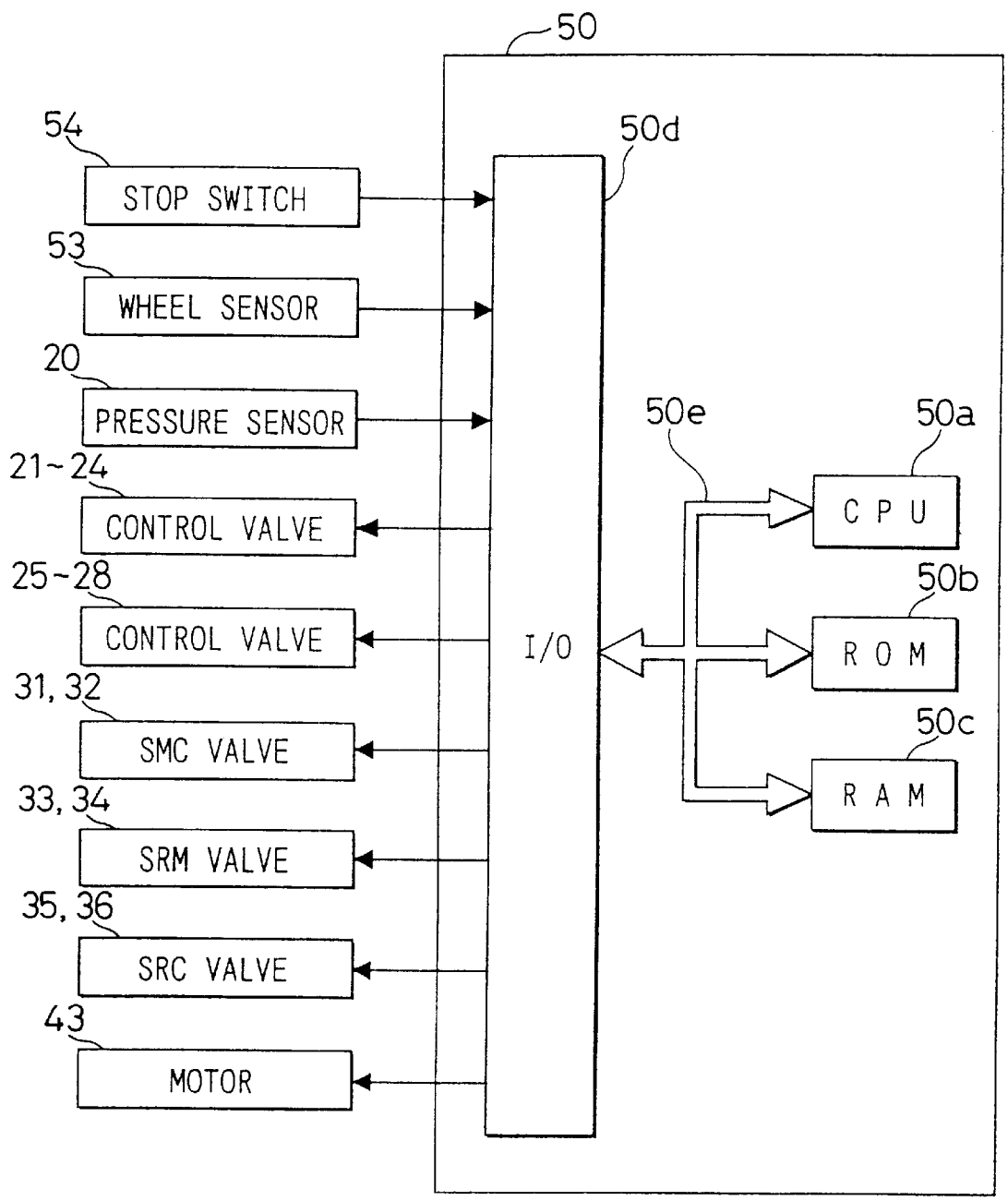
FIG. 2 is an electrical block diagram of the brake control apparatus for the vehicle according to the first embodiment of the present invention.

Referring to FIG. 2, an ECU 50 for controlling the above-mentioned brake system is mainly constructed by a computer having well-known CPU 50a, ROM 50b, RAM 50c, I/O circuit 50d and BUS line 50e. The ECU 50 is connected to sensors such as wheel sensors 53 for detecting each of the wheel speeds, a stop switch 54 for detecting an operation of the brake pedal 3 and the pressure sensor 20. The ECU 50 inputs signals from the sensors. The ECU 50 is connected to actuators such as the valves 21 - 28 and 31 - 36 and the motor 43. The ECU 50 outputs command signals for driving the actuators.

Figure 3:
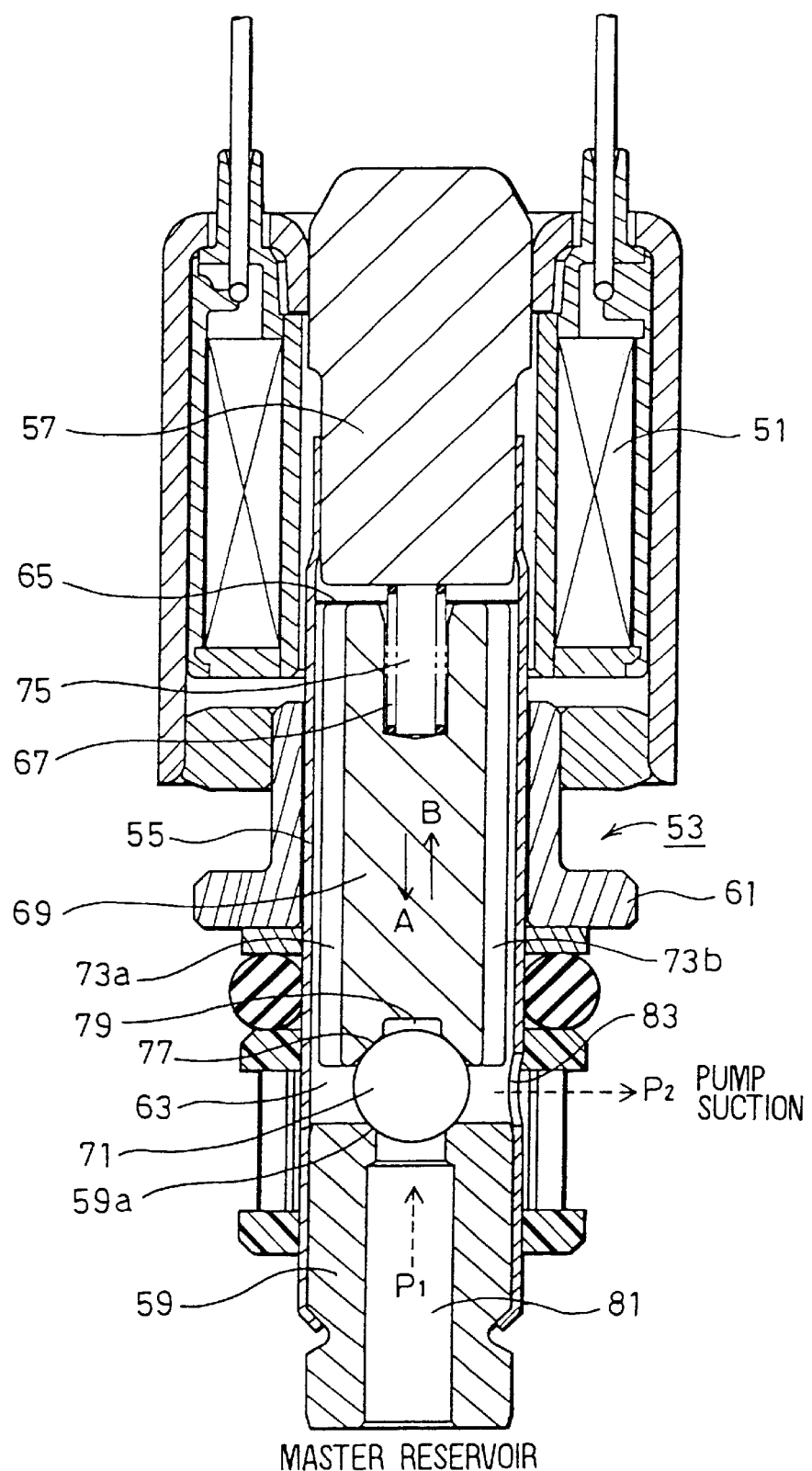
FIG. 3 is a sectional view of an electromagnetic valve according to the first embodiment of the present invention.

Hereinafter, the valve 35 will be explained. The valve 36 is similar to the valve 35. Referring to FIG. 3, the valve 35 has a valve part having a member 59 and 71, and an actuator part having a member 69, 57, and 51. The valve 35 has a cylindrical coil 51 and a valve mechanism 53 disposed coaxially in the coil 51 for opening and closing a passage between an inlet port 81 and an outlet port 83 that is the passage 45c. The valve mechanism 53 has a sleeve 55, a stopper 57 fixed on one end of the sleeve 55 and a valve seat 59 fixed on the other end of the sleeve 55. A stator core 61 is disposed around a center portion of the sleeve 55.

An annular plate 65, a spring 67, a plunger 69 and a ball 71 are disposed in a chamber 63 of the sleeve 55. The plunger 69 is movably supported in the sleeve 55 as an armature of an electromagnetic actuator. The ball 71 is disposed between the plunger 69 and the valve seat member 59 as a movable member of a valve. In this embodiment, the plunger 69 and the ball 71 are made as independent members, which are separated to allow an individual movement when the plunger 69 and the ball 71 do not contact each other. The plate 65 is made of a non-magnetic material. The plate 65 is movably disposed in vertical direction for assisting a separation between the plunger 69 and the stopper 57 when the coil 51 is changed from an energized state (ON) to a de-energized state (OFF). The spring 67 pushes the plunger 69 toward the valve seat 59 as a means for applying a force. The valve normally closes the passage by a force of the spring 67. The plunger 69 is made of magnetic material and is formed as a column. The plunger 69 is attracted and moves in a direction B by a magnetic force generated by the coil 51 when the coil 51 is energized.

A pair of grooves 73a and 73b is formed on an outside of the plunger 69. The grooves 73a and 73b axially extend to connect both ends of the plunger 69 for providing a passage. The plunger 69 has an upper depression 75 for accommodating the spring 67 and a lower depression 77 for receiving the ball 71.

Figure 4:
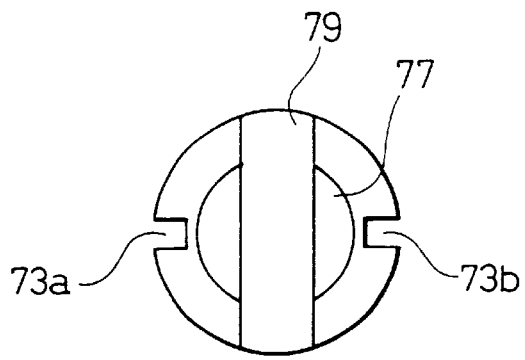
FIG. 4 is a bottom plan view of a plunger according to the first embodiment of the present invention.

Referring to FIG. 4, the lower depression 77 is a conical depression for supporting the ball 71 easily. A groove 79 is formed on a lower surface of the plunger 69 to cross the lower depression and to connect both outer ends of the plunger 69. The groove 79 supplies the fluid on an upper side of the ball 71. Therefore, the ball 71 can easily separate from the lower depression 77. The ball 71 is a sphere. The ball 71 is freely movable between the lower depression 77 and the valve seat 59 when the plunger 69 moves a maximum distance in the direction B. A diameter of the ball 71, a depth of the lower depression 77 and a movable distance of the plunger 69 are selected to prevent an escape of the ball from a proper position. The valve seat 59 has a seat surface 59a. When the ball 71 is seated on the seat surface 59a the valve closes the passage. In this embodiment, the lower depression 77 keeps the ball 71 in a proper position even when the ball 71 separates from the plunger 69. Therefore, the lower depression 77 prevents the ball 71 from moving out of the proper position.

The valve seat 59 has the inlet port 81 communicating to the master reservoir via a pipe K1 as shown in FIG. 1. A pressure in the inlet port 81 and the pipe K1 is indicated by P1. The sleeve 55 has the outlet port 83 communicating to a pipe K2 disposed on a suction side of the pump 41 as shown in FIG. 1. A pressure in the outlet port 83 and the pipe K2 is indicated by P2. In this embodiment, normally, a pressure in the chamber 63 is also P2.

Next, an operation of the valve will be explained. Here, an operation during the ABS control will be explained. In a case of the ABS control, the pump 41 is activated to increase the fluid pressure (e.g., a pressure in the wheel cylinder). During the operation, since a required pressure is different according to a control condition, the fluid pressure is controlled by a duty control of an applying voltage to the motor 43.

When the coil 51 is de-energized, the spring 67 pushes the plunger 69 and the ball 71 in a direction A. Therefore, the ball 71 is seated on the seat surface 59a and closes a passage between the pipe K1 and the pipe K2. For instance, when the vehicle runs constant speed, the ABS control and the pump 41 are not activated. Therefore, the coil 51 is not energized and the valve 35 keeps a closed condition.

If a large pressure difference between both axial ends of the plunger 69 is generated, the plunger 69 may move in the direction B. For instance, when the motor 43 is quickly controlled by the duty control, the pump 41 generates a pulsation in the pressure P2 which causes the pressure difference in which a higher pressure is generated on the lower end of the plunger 69. If the pressure difference increases more than the force of the spring 67, the plunger 69 moves upwardly. However, in this embodiment, since the plunger 69 is separated from the ball 71, the ball 71 is not directly attracted in the direction B. The ball 71 is kept on the seat surface 59a during the pressure P2 is higher than the pressure P1. When the pressure P2 is increased by the pulsation, the plunger 69 may moves upwardly but the ball 71 is kept on the seat surface 59a by the increased pressure P2. Therefore, the valve 35 acts as a one-way valve.

When a high pressure is required to activate the ABS control (for instance, a large braking force is required), the coil 51 is energized. The plunger 69 is attracted by the coil 51 and moves in the direction B against a spring force. Therefore, the ball 71 can create a gap between the seat surface 59a. In a case of P1>P2, for instance, the pressure P2 is lowered by an activation of the pump 41 lower than the pressure P1, the ball 71 is lifted from the seat surface 59a to open the passage between the pipe K1 and the pipe K2. As a result, the brake fluid is supplied from the master reservoir 7 to the suction side of the pump 41.

In this embodiment, it is possible to prevent an undesired opening when an electric signal applied to the valve indicates a closing condition. It is possible to prevent a reverse flow of the brake fluid from the suction side of the pump 41 to the master reservoir 7. In this embodiment, since it is not required a greater spring force to provide a sufficient spring force against the pressure difference, the valve can be small. Further, since the reverse flow of the brake fluid is prevented, the hydraulic circuit can provide an appropriate performance of the controls such as the ABS control, the VSC control, the TRC control or the ASB control.

Figure 5:
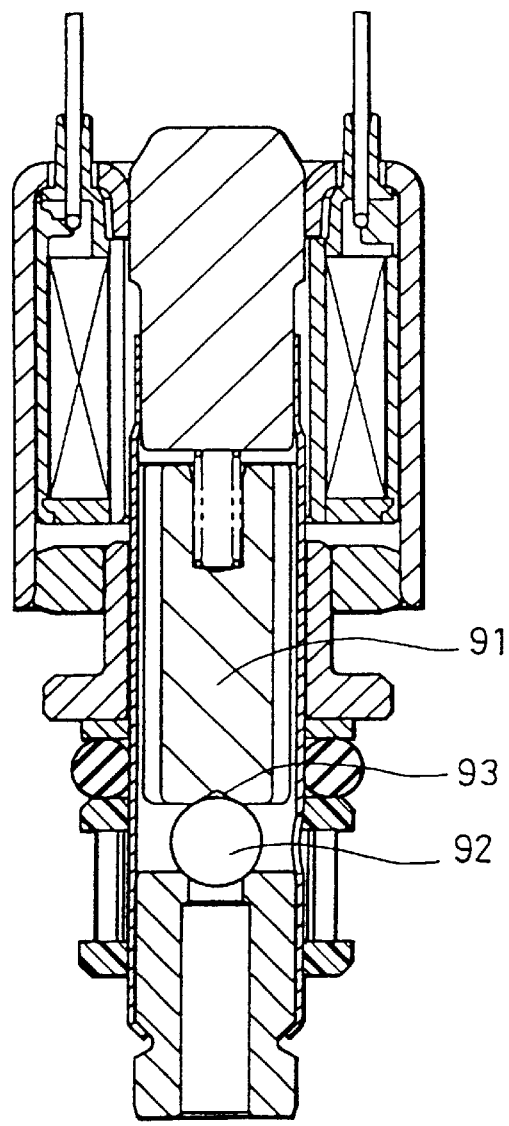
FIG. 5 is a sectional view of an electromagnetic valve according to a second embodiment of the present invention.

FIG. 5 shows a second embodiment of the present invention. In this embodiment, a plunger 91 and a ball 92 are also separated similar to the first embodiment. However, only a shape of a lower end of the plunger 91 is different from the first embodiment. The plunger 91 only has a conical depression 93 on a lower end. The plunger 91 does not have the groove on the lower end.

Figure 6:
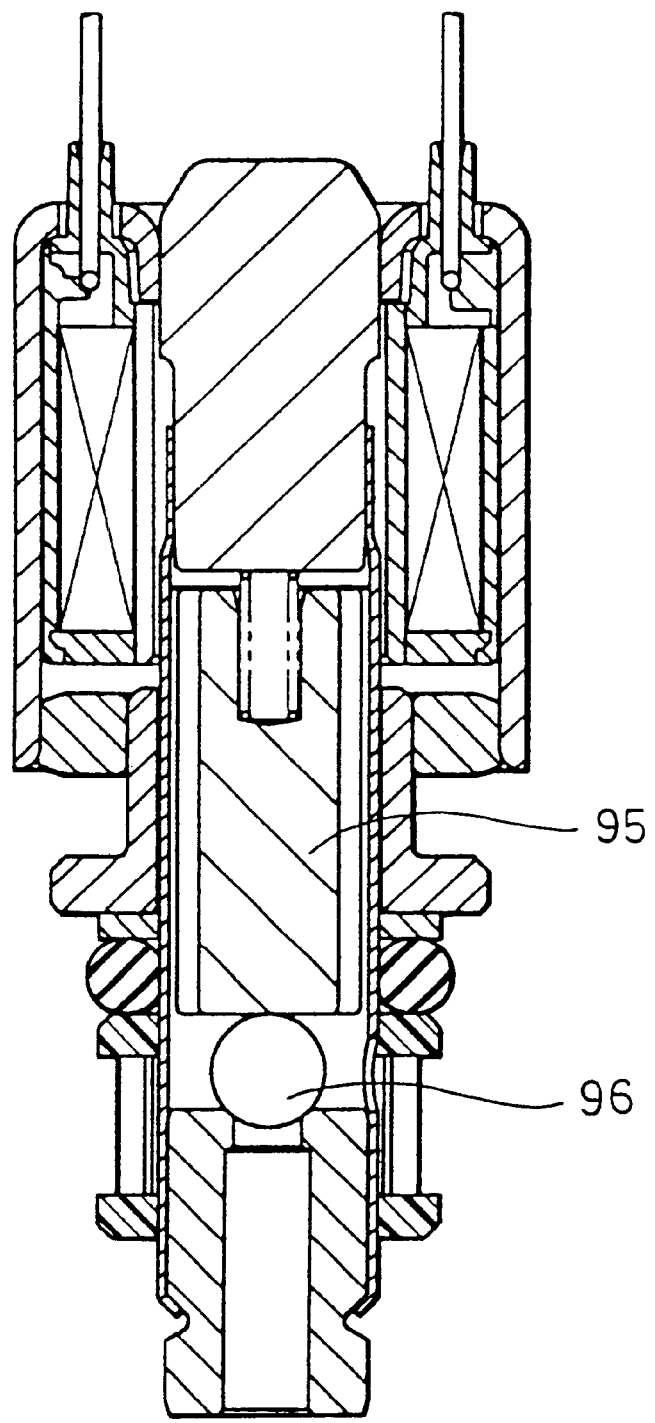
FIG. 6 is a sectional view of an electromagnetic valve according to a third embodiment of the present invention.
Figure 7:
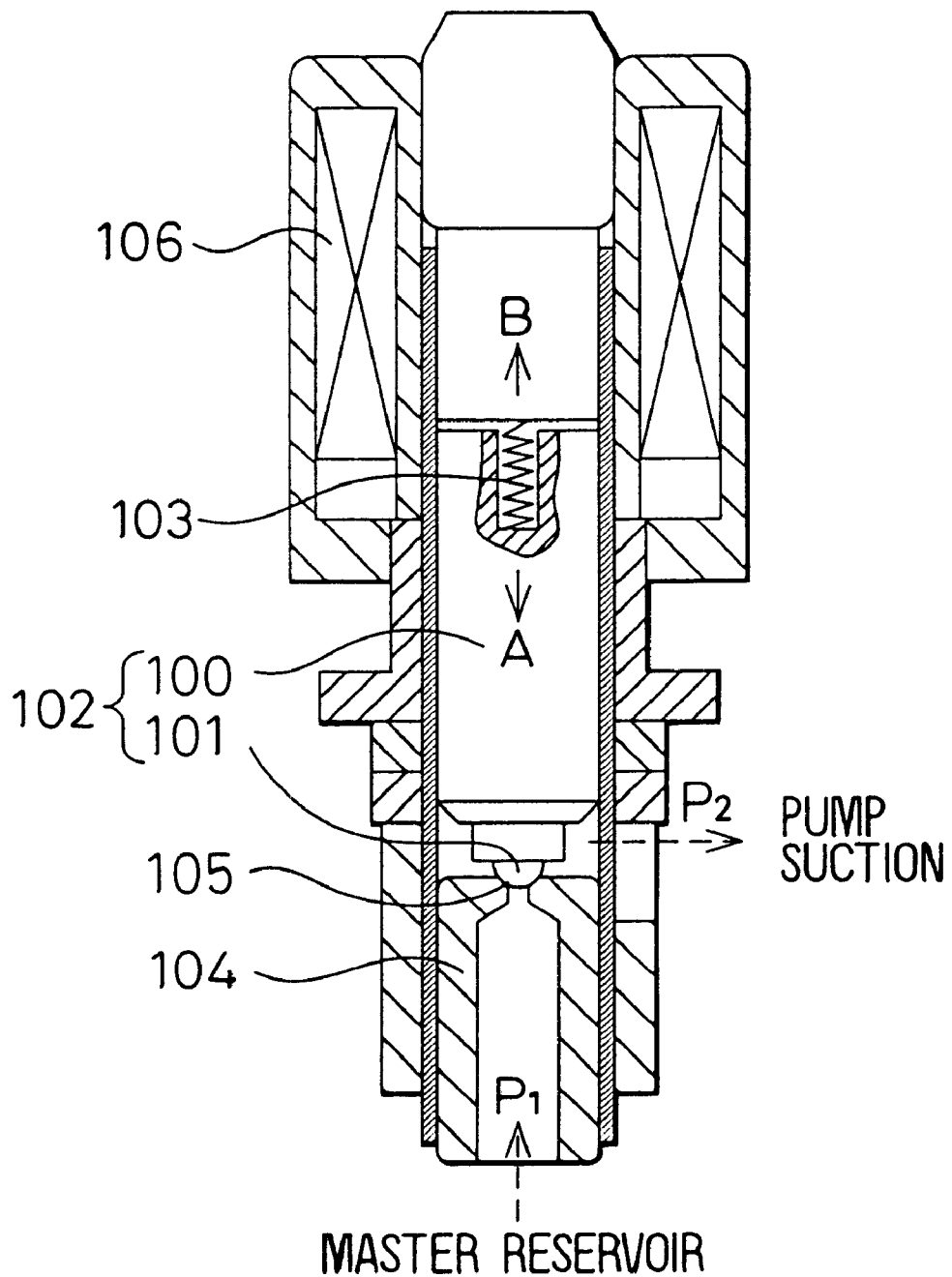
FIG. 7 is a sectional view of an electromagnetic valve according to a prior art.

FIG. 6 shows a third embodiment of the present invention. In this embodiment, a plunger 95 and a ball 96 are also separated similar to the first embodiment. However, only a shape of a lower end of the plunger 95 is different from the first embodiment. The plunger 95 has a flat surface on the lower end.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An electromagnetic valve comprising:
a valve having a seat member for providing a passage thereon and a movable member for opening and closing said passage;
an actuator having a coil for generating a magnetic force and a plunger for actuating said movable member in a closing direction in response to said magnetic force;
a means for applying a force to said plunger in a direction to close said valve, wherein said plunger and said movable member are made as independent members, and
wherein said valve acts as an one-way valve for keeping a closing condition in response to a pressure in a side of said plunger which is higher than a pressure in a side of said seat member even when said plunger and said movable member are separated.

2. An electromagnetic valve according to claim 1, wherein a side of said plunger is communicated to a suction side of a pump and a side of said seat member is communicated to a master reservoir.

3. An electromagnetic valve according to claim 1, wherein said plunger has a depression on an end thereof facing said movable member, said depression receiving a part of said movable member.

4. An electromagnetic valve according to claim 3, wherein said depression provides a conical tapered surface.

5. An electromagnetic valve according to claim 1, wherein said plunger has a passage on an end thereof facing said movable member, said passage introducing a fluid into between said plunger and said movable member.

6. An electromagnetic valve according to claim 1, wherein said movable member is a ball.

7. A hydraulic circuit having a pump for pressurizing a brake fluid, a means for supplying said brake fluid and said electromagnetic valve according to claim 1, wherein a side of said plunger is communicated to said pump and a side of said seat member is communicated to said supplying means.

8. A hydraulic circuit having said electromagnetic valve according to claim 1, wherein said hydraulic circuit is a brake fluid circuit being controlled by at least one of an advanced servo brake control, a trace control, and a traction control.

9. A hydraulic circuit comprising:
a pump for pressuring a brake fluid and supplying said fluid to a wheel cylinder;
an accumulator communicated to a suction side of said pump for supplying said brake fluid to said pump;
an electromagnetic valve comprising:
a valve having a seat member for providing a passage thereon and a movable member for opening and closing said passage;
an actuator having a coil for generating a magnetic force and a plunger for actuating said movable member in a closing direction in response to said magnetic force; and
a means for applying a force to said plunger in a direction to close said valve,
wherein said plunger and said movable member a re made as independent members and
said hydraulic circuit further comprising a reservoir communicated to a suction side of said pump for supplying said brake fluid to said pump; wherein said electromagnetic valve is disposed between said suction side of said pump and said reservoir for opening and closing a passage therebetween, and wherein said plunger actuates said movable valve only in a direction to close said passage, and wherein said movable member opens said passage only when said plunger is attracted by said coil and a pressure in said suction side is lower than a pressure in said reservoir side.

10. A hydraulic circuit according to claim 9, wherein said hydraulic circuit is a brake fluid circuit being controlled by at least one of an advanced servo brake control, a trace control, and a traction control.

* * * * *